July 17, 1956   N. SLOANE   2,755,053
UNIVERSAL MOUNTING DEVICES FOR PHOTOGRAPHIC APPARATUS
Filed Aug. 16, 1952   2 Sheets-Sheet 1
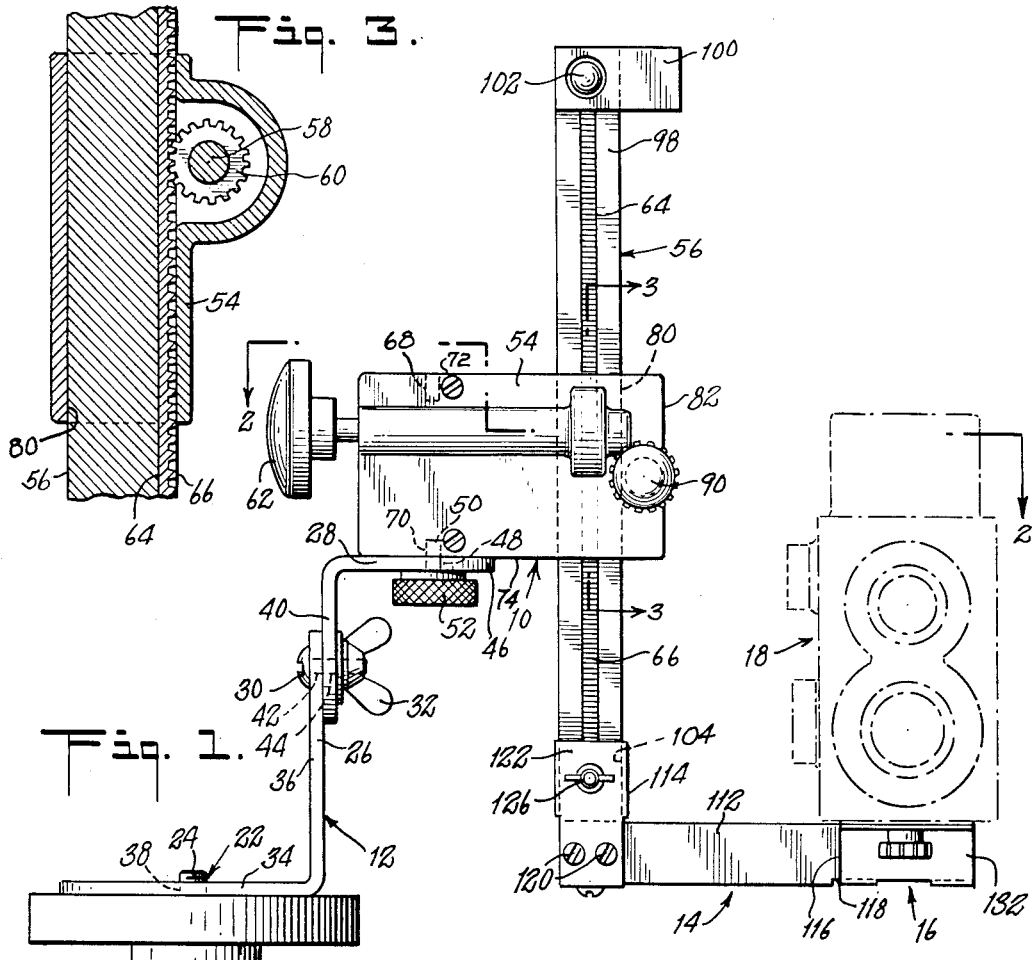
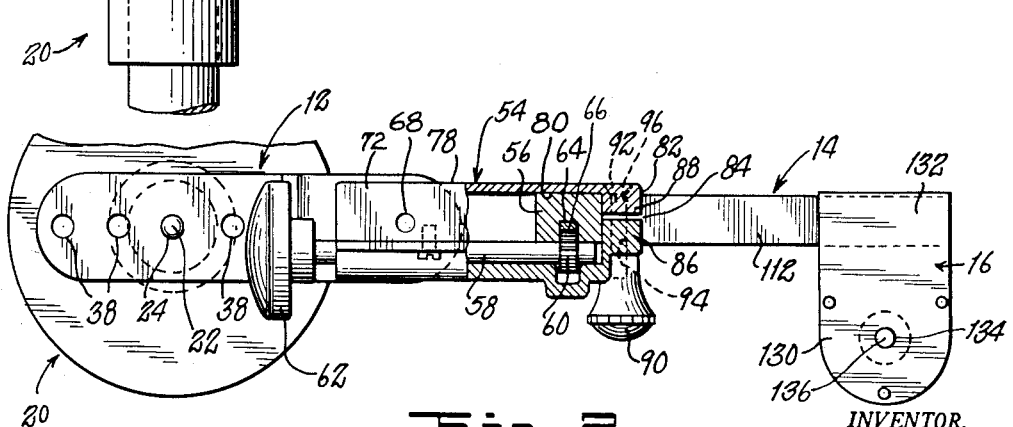
INVENTOR.
NATHAN SLOANE
BY
Henry L. Durkitt
ATTORNEY July 17, 1956
N. SLOANE
2,755,053
UNIVERSAL MOUNTING DEVICES FOR PHOTOGRAPHIC APPARATUS
Filed Aug. 16, 1952
2 Sheets-Sheet 2
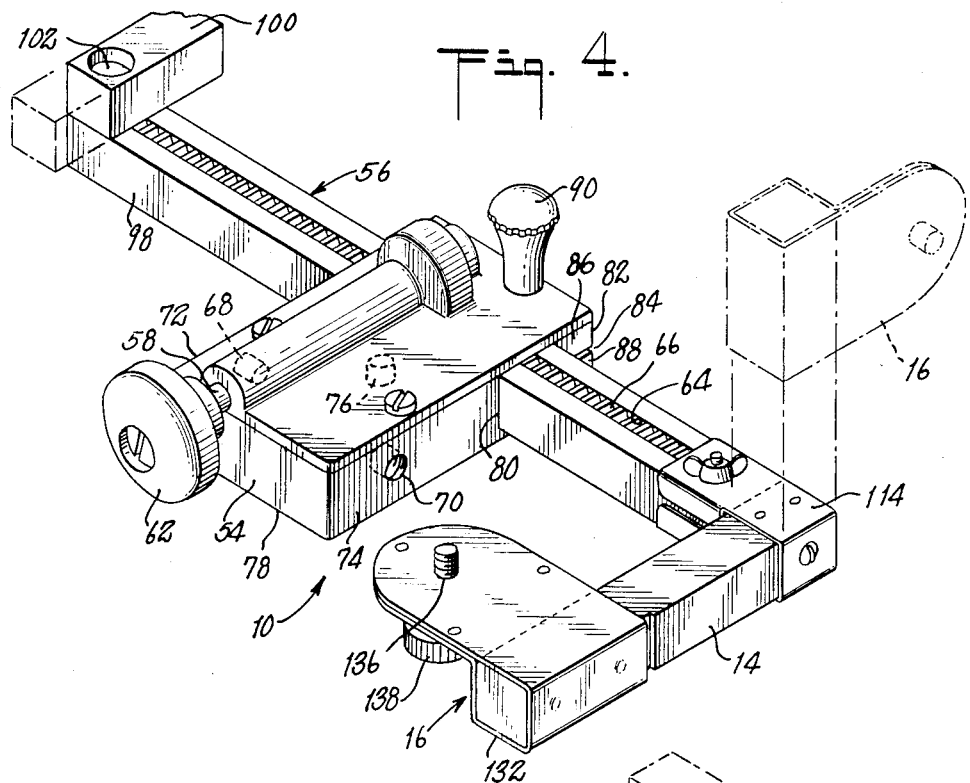
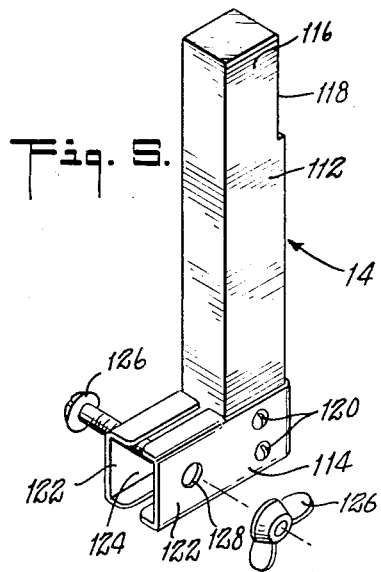
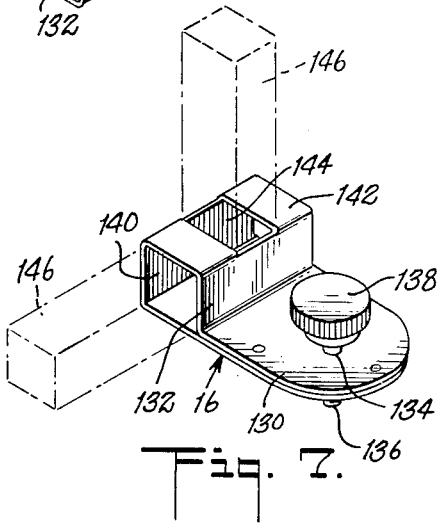
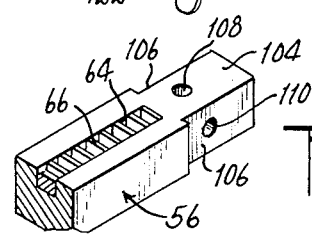
INVENTOR.
NATHAN SLOANE
BY
Henry L. Burkitt
ATTORNEY

United States Patent Office 2,755,053
Patented July 17, 1956

2,755,053

UNIVERSAL MOUNTING DEVICES FOR PHOTOGRAPHIC APPARATUS

Nathan Sloane, Brooklyn, N. Y.

Application August 16, 1952, Serial No. 304,725

19 Claims. (Cl. 248—179)

This invention relates generally to universal mounting devices for photographic apparatus. More particularly, the invention relates to a mounting bracket adapted to be used in conjunction with a camera tripod, or in relation to like mountings.

Supporting devices, such as tripods of the conventional types, adapted for supporting photographic apparatus, generally have limited adjustability. Accordingly, great difficulty and delays are experienced in orienting the camera to "shoot" scenes beyond the range of such limited adjustability. In most cases, it is necessary to relocate the tripod and the assembled apparatus in order to bring within proper range, subjects not covered by a first positioning.

It is accordingly an object of the invention to provide a mounting device to provide, for cameras, or like apparatus, a range of adjustability far greater than that of heretofore used mounting devices.

Another object of the invention is the provision of a universal mounting device for cameras which permits relatively minute and accurate adjustment of a device such as a camera within its range of adjustability.

Another object of the invention is the provision of a universal mounting device for cameras to cooperate with a plurality of associated brackets either individually, or in combination, adjustably to mount a camera or like device in a multitude of attitudes.

Another object of the invention is the provision of a universal mounting device of the above character, for a camera or the like, which is simple in design and construction, economical to manufacture, and highly efficient in the accomplishment of its intended purpose.

Other objects, features and advantages of the invention will become apparent from the description, when considered in connection with the accompanying illustrative drawings, in which:

Fig. 1 is a side elevational view of a universal mounting device embodying features of the invention, together with which are associated a plurality of brackets in one possible arrangement, the device being shown secured to a tripod, and having a camera associated therewith, the camera being shown in dotted lines;

Fig. 2 is a detail sectional view, taken substantially on the line 2—2 of Fig. 1;

Fig. 3 is a detail sectional view, taken substantially on the line 3—3 of Fig. 1;

Fig. 4 is a perspective view of the universal mounting device embodying features of the invention, a plurality of brackets being shown in various possible positions;

Fig. 5 is a perspective view of one of the brackets for association with the universal mounting device, shown assembled with an arm of the device;

Fig. 6 is a detail fragmentary perspective view of a part of the rack of the universal mounting device; and Fig. 7 is a perspective view of a bracket of the universal mounting device, illustrating some of its structural effects.

Referring to the drawings, and more particularly to Fig. 1, a universal mounting device 10, embodying features of the invention, may include a number of brackets; certain of these brackets are designated generally as 12, 14 and 16. The brackets may be associated with device 10 and camera 18 in a plurality of different relations to present camera 18 in a multitude of different attitudes with relation to the object to be photographed. Bracket 12 may also be used individually, or in combination, to mount camera 18 in a wide range of different attitudes with relation to any suitable fixed support, as, for instance, the edge of a table, or upon tripod 20.

Mounting device 10 may comprise means directly and adjustably to mount camera 18 upon tripod 20. Cameras usually are provided with a threaded socket in one or more of its surfaces. The tripod may have a movably mounted member 22 having a threaded end 24 to project upwardly from the tripod. This stud is intended to engage the threaded socket in camera 18.

Bracket 12 may comprise a pair of complementary angle members 26 and 28, which are adapted to be adjustably secured to each other upon a pivot pin or bolt 30. Tightening of a wing nut 32 on bolt 30 will retain members 26 and 28 in any position to which they may have been adjusted. Legs 34 and 36 of member 26 are substantially at right angles to each other; leg 34 may have an aperture 38 threaded for the reception of end 24, to retain bracket 12 upon the tripod, as shown in Fig. 1. If desired, leg 34 may have a plurality of spaced apertures 38 so that bracket 12 may be related to the tripod in a plurality of different positions.

Leg 36 of member 26 and leg 40 of member 28 are respectively provided with apertures 42 and 44 for the reception of bolt 30. The angular relation of members 26 and 28 may be adjusted readily by this means; to insure firm locking of the members in a set angular position, one of legs 36 and 40 may be provided with a protuberance, and the other leg, with a series of apertures spaced around a circle concentric with apertures 42 and 44, so that, when the protuberance registers with one of the series of apertures, and nut 32 is tightened on bolt 30, the cooperation of the protuberance and one of the series of apertures will prevent rotation on bolt 30 as an axis. Further, if desired, leg 36 may be provided with a series of apertures similar to aperture 42, longitudinally spaced, so that member 28 may be associated with member 26 in a plurality of different relative positions, as will be readily understood.

The laterally projecting leg 46 of member 28 may have an opening 48 in which is loosely retained, in a well-known manner, the threaded stem 50 at the end of a knurled knob 52. Stem 50 has the same threading as end 24, and thus provides for retention of camera 18 upon bracket 12, or of device 10 on bracket 12, as will be apparent.

Device 10 (Figs. 1–3) may include a casing 54 through which moves a rack member 56. Casing 54 is formed to provide bearings for a spindle 58 which, at one end, has fixed thereto a pinion 60, and at its other end, an adjusting knob 62. Rack member 56 may be constructed from a wooden bar provided with a recess 64 in which is seated and retained a rack 66 with which pinion 60 is in mesh to effect longitudinal movement of the rack member through the casing upon rotation of spindle 58 by knob 62. Rack 66 preferably extends for substantially the entire length of member 56 so that the latter may be translated relatively to casing 54 for a range corresponding to the length of member 56.

Casing 54 may be of any desired configuration; it may be provided with threaded apertures 68 and 70 in its respective side walls 72 and 74, and a threaded aperture 76, in its bottom wall 78, for cooperation with end 24 and stem 50, removably to support device 10 on bracket 12 or tripod 20. Member 56 may be rectangular in cross-section, so that it may be received in and extend through aperture 80 in casing 54. Wall 82 of casing 54 preferably is formed with a slot 84 so as to define portions 86 and 88. By suitable means, these portions may be moved toward each other, thus tightly to bind pinion 60 against rack 66, in order to prevent movement of member 56 relative to casing 54. To effect this result, a clamping knob 90 on the end of a screw 92 is rotated. Screw 92 extends through an aperture 94 in portion 86 to engage in a threaded aperture 96 in portion 88. Knob 90 bears against portion 86 to force the portions toward each other against the natural elasticity of the material of casing 54.

When member 56 is intended to be adjusted relatively to casing 54, knob 90 is rotated to release it from engagement against portion 86; after the desired adjustment has been obtained, knob 90 is manually rotated to secure the rack member and the casing again in the desired adjusted relationship.

One end 98 of member 56 may have adjustably secured thereto a connector element 100; by means of this element, members such as bracket 14 may be associated with the device. Element 100 is mounted to permit pivotal movement about an axis transverse to member 56, as shown in Fig. 4; it may be secured adjustably to member 56 in any suitable manner, as, for instance, by means of a pin 102. Element 100, for certain purposes, may be of rectangular cross-section.

Member 56 (Fig. 6), at its other end 104, may be cut away, as indicated at 106, to reduce it, in shape and size, to that of element 100; obviously, member 56, for certain purposes, could be of the same cross-sectional shape and size as end 104 throughout, to eliminate the necessity for cut-away faces, except as factors such as strength of material and the like may dictate. At end 104, cross apertures 108 and 110 may extend therethrough substantially perpendicularly to each other. End 104 may thus serve as a connection between device 10 and bracket 14 or with bracket 16.

Bracket 14 may comprise an elongated member 112 having a fitting 114 secured thereto at one end. The other end 116 of member 112 may have a face cutaway, as at 118, to define a cross-sectional shape and size similar to element 100 and end 104 in order to adapt it as a connection between brackets 14 and 16. Fitting 114 may be secured to member 112 in any conventional manner so as to laterally project therefrom, as, for instance, by means of screws 120. Fitting 114 may define a pair of channel legs 122, the channels being disposed in confronting relationship to define a socket 124. Legs 122 are intended to be clamped to end 104 in any one of a number of relations, approximately 90 degrees apart, by means of bolt-and-nut assembly 126.

Legs 122 may be apertured, as indicated at 128, so that the bolt of assembly 126 may be extended therethrough and through one of apertures 108 and 110 of member 56; tightening of the wing nut of assembly 126 then effectively clamps legs 122 against end 104. Socket 124, complementary to end 104, may be secured to end 104 in any one of a number of positions, as will be readily apparent. Accordingly, socket 124, in cooperation with end 104, provides means for a separable association of bracket 14 and device 10.

Bracket 16, which may be made from a single piece of sheet metal (Figs. 4 and 7), may be formed as a plate-like member 130, defining a non-cylindrical tubular fitting 132 at one end. An aperture 134 may be provided for the reception of a threaded member 136 loosely held in the aperture; member 136 may have a knob 138 secured thereto. Member 136 is threaded in the same manner as end 24 and stem 50, and is adapted to be engaged in the mounting socket of camera 18 to secure it adjustably in position.

Fitting 132 may be shaped to define a non-circular aperture 140 formed therethrough, the aperture being generally rectangular in cross-section and dimensioned to receive ends 104 and 116 and connector element 100. Top wall 142 of the fitting may have an aperture 144 intermediate its ends, this aperture being cross-sectionally of the same size and shape as aperture 140, to receive ends 104 and 116 and element 100. Thus, ends 104 and 116 and element 100 may be assembled with either aperture 140 or 144 for a separable association of bracket 16 with either device 10 or bracket 14. Ends 104 and 116 and element 100 fit frictionally to either end of and into aperture 144. As shown in Fig. 7 in broken lines, element 146, which may be either one of ends 104 and 116 or element 100, may be secured to bracket 16 in any one of a number of positions approximately 90 degrees apart.

As demonstrated, bracket 12 may be associated with tripod 20 by means of the cooperative association between end 24 and aperture 38, and said bracket may be adjusted to any angular position about the axis of the head of the tripod. Camera 18 may be secured directly to bracket 12 by means of stem 50; legs 36 and 40 of the bracket are adjustable angularly relatively to each other about the axis of bolt 30. Device 10 may be secured directly to tripod 20 in any one of a number of positions approximately 90 degrees apart through the cooperative association of end 24 and one of threaded apertures 68, 70 and 76 in casing 54, or said device may be secured to bracket 12 in a corresponding manner, as shown in Fig. 1. Member 56 may be translated relatively to casing 54 by the manual rotation of handle 62, so that said member may function for either lateral or vertical adjustment, depending upon what the relative mounting of device 10 is with relation to tripod 20 or bracket 12. Bracket 14 is adapted to be secured to device 10, through the cooperative association of fitting 114 and end 104, said bracket being adapted to be secured to said member in any one of a number of positions. Bracket 16 is adapted to be secured to either device 10 or bracket 12, and has a member 136 for retaining a camera 18 therewith.

In Fig. 1, bracket 16 is shown secured to bracket 14 in one position; in Fig. 4, bracket 16 is shown secured to bracket 14 in another position. As described in detail above, brackets 14 and 16 may be secured to either end 104 of member 56, to end 116, or to the free end of connector element 100. It will be apparent that a multitude of combinations may be achieved through the use of the device and the brackets described, whereby a practically infinite range of adjustments for the camera may be obtained.

If desired, the device and brackets may be utilized to mount camera 18 universally without the use of a tripod. For this purpose, one of the elements may, by suitable means, be clamped directly to a support. For example, a conventional C-clamp may be used for this purpose. Thus, either bracket 12 or device 10 may be clamped to any suitable support in order to be able to mount the camera firmly, and yet with the features of adjustability described above, even though without the use of a tripod.

It will thus be apparent that device 10 provides a unique range of adaptability and adjustability, and permits fine and accurate adjustment of the camera position. The brackets associated with device 10 may be utilized individually, or in combination, in the manner described above adjustably to mount a camera in a multitude of attitudes, and to minimize the necessity for frequent relocation of the tripod, when the latter is used for mounting device 10, and the camera. For instance, it is possible to use device 10, as shown in Fig. 4 for adjustment toward and away from an object to be photographed, or, as shown in Fig. 1, for various vertical adjustments, either from a high position, or a low position.

While there is shown and described herein certain specific structure embodying the invention, it will be manifest to those skilled in the art that various modifications and rearrangements of the parts may be made without departing from the spirit and scope of the underlying invention, and that the same is not limited to the particular form herein shown and described except insofar as indicated by the scope of the claims.

What is claimed as new and useful is:

1. A universal mounting device adapted for mounting on a tripod having a threaded stud, the device comprising first bracket means having a projecting leg, said leg having a threaded aperture for reception of said threaded stud, said first bracket means having another projecting leg, a threaded stud associated with said other projecting leg and complementary to said threaded aperture, second bracket means having at least one aperture threaded complementarily to said studs, whereby said second bracket means may be secured releasably to either the tripod or said first bracket means, said second bracket means having a member axially reciprocable relative thereto, and means for axially reciprocating said member.

2. A universal mounting device adapted for mounting on a tripod having a threaded stud for supporting a camera having a threaded mounting socket, the device comprising first and second bracket means, said first bracket means comprising a pair of complementary angle members pivotally connected to each other, whereby said angle members are adjustable angularly with relation to each other, one of said angle members having a projecting leg, said leg having an aperture threaded complementarily to said stud for mounting on said tripod, the other angle member including a projecting leg having a threaded stud associated therewith, the last mentioned stud being complementary to said camera mounting socket, said second bracket means having at least one aperture threaded complementarily to said studs, whereby said second bracket means may be attached releasably to said tripod or to said first bracket means, said second bracket means having a member mounted to be axially reciprocable relatively thereto, and means for axially reciprocating said member.

3. A universal mounting device adapted for mounting on a tripod having a threaded stud, the device comprising first bracket means having a projecting leg, said leg having a threaded aperture for reception of said threaded stud, said first bracket means having another projecting leg, a threaded stud associated with said other projecting leg and complementary to said threaded aperture, second bracket means having a plurality of apertures threaded to be complementary to said studs, said plurality of apertures having their axes substantially perpendicular to each other, whereby said second bracket means may be releasably associated with either the tripod or said first bracket means in a plurality of different positions, said second bracket means having a member mounted to be axially reciprocable relatively thereto, and means for axially reciprocating said member.

4. A universal mounting device adapted for mounting on a tripod having a threaded stud for supporting a camera having a threaded mounting socket, the device comprising first and second bracket means, said first bracket means comprising a pair of complementary angle members pivotally connected to each other, whereby said angle members are adjustable angularly with relation to each other, one of said angle members having a projecting leg, said leg having an aperture threaded complementary to said stud for mounting on said tripod, the other angle member including a projecting leg having a threaded stud associated therewith, the last mentioned stud being complementary to said camera mounting socket, said second bracket means comprising a casing having a plurality of apertures threaded to be complementary to said studs, a pair of said plurality of apertures being substantially coaxial and positioned at opposite sides of said casing, at least one of said plurality of apertures having its axis substantially perpendicular to said pair of apertures, whereby said casing may be releasably attached to a tripod or to said first bracket means in a plurality of different positions, and said casing carrying an axially reciprocable member adapted to support said camera to be associated therewith.

5. A universal mounting device adapted for mounting on a tripod having a threaded stud, the device comprising first bracket means having a projecting leg, said leg having a threaded aperture for reception of said threaded stud, said first bracket means having another projecting leg, a threaded stud associated with said other projecting leg and complementary to said threaded aperture, second bracket means having a plurality of apertures threaded to be complementary to said studs, said plurality of apertures having their axes substantially perpendicular to each other, whereby said second bracket means may be secured releasably to either the tripod or said first bracket means in a plurality of different positions, said second bracket means having a member mounted to be axially reciprocable relatively thereto, and means for axially reciprocating said member, said latter means comprising rack and pinion mechanism.

6. A universal mounting device adapted for mounting on a tripod having a threaded stud for supporting a camera having a threaded mounting socket, the device comprising first and second bracket means, said first bracket means comprising a pair of complementary angle members pivotally connected to each other, whereby said angle members are adjustable angularly with relation to each other, one of said angle members having a projecting leg, said leg having an aperture threaded complementarily to said stud for mounting on said tripod, the other angle member including a projecting leg having a threaded stud associated therewith, the last mentioned stud being complementary to said camera mounting socket, said second bracket means comprising a casing having a plurality of apertures threaded to be complementary to said studs, a pair of said plurality of apertures being substantially coaxial and positioned at opposite sides of said casing, at least one of said plurality of apertures having its axis substantially perpendicular to said pair of apertures, whereby said casing may be releasably attached to a tripod or to said first bracket means in a plurality of different positions, and said casing carrying an axially reciprocable member adapted to support said camera to be associated therewith, means for axially reciprocating said member comprising a pinion disposed in said casing, a rack driven by said pinion, and a handle for operating said pinion and said rack, whereby movement of said handle effects axial movement of said member.

7. A universal mounting device adapted for mounting on a tripod having a threaded stud, the device comprising first bracket means having a projecting leg, said leg having a threaded aperture for reception of said threaded stud, said first bracket means having another projecting leg, a threaded stud associated with said other projecting leg and complementary to said threaded aperture, second bracket means having at least one aperture threaded complementarily to said studs, whereby said second bracket means may be secured releasably to either the tripod or said first bracket means, said second bracket means having a member axially reciprocable relatively thereto, third bracket means having a fitting secured to one end thereof, one end of said axially reciprocable member being formed to be complementary to said fitting, said fitting and said member end having cooperating means whereby the latter may be secured to the former in a plurality of different positions, and means for axially reciprocating said member.

8. A universal mounting device adapted for mounting on a tripod having a threaded stud for supporting a camera having a threaded mounting socket, the device comprising first, second and third bracket means, said first bracket means comprising a pair of complementary angle members pivotally connected to each other, whereby said angle members are adjustable angularly with relation to each other, one of said angle members having a projecting leg, said leg having an aperture threaded complementarily to said stud for mounting on said tripod, the other angle member including a projecting leg having a threaded stud associated therewith, the last mentioned stud being complementary to said camera mounting socket, said second bracket means having at least one aperture threaded complementarily to said studs, whereby said second bracket means may be attached releasably to said tripod or to said first bracket means, said second bracket means having a member mounted to be axially reciprocable relatively thereto, said third bracket means having a fitting secured to one end thereof, one end of said axially reciprocable member being complementary to said fitting, said fitting and said member end having cooperating means whereby the latter may be secured to the former in a plurality of different positions, and means for axially reciprocating said member.

9. A universal mounting device adapted for mounting on a tripod having a threaded stud, the device comprising first bracket means having a projecting leg, said leg having a threaded aperture for reception of said threaded stud, said first bracket means having another projecting leg, a threaded stud associated with said other projecting leg and complementary to said threaded aperture, second bracket means having at least one aperture threaded complementarily to said studs, whereby said second bracket means may be secured releasably to either the tripod or said first bracket means, said second bracket means having a member axially reciprocable relatively thereto, third bracket means having a fitting secured to one end thereof, one end of said axially reciprocable member being formed to be complementary to said fitting, said fitting and said member end having cooperating means whereby the latter may be secured to the former in a plurality of different positions, means for axially reciprocating said member, said fitting defining a socket adapted for the reception of said member end, and a removable pin member extending through said fitting and transversely of said fitting socket, said member end having a plurality of apertures extending transversely therethrough, said last mentioned apertures being angularly spaced, whereby said fitting and said member end may be secured releasably to each other in a plurality of different positions, said pin member and said last mentioned apertures constituting said cooperating means.

10. A universal mounting device adapted for mounting on a tripod having a threaded stud, the device comprising first bracket means having a projecting leg, said leg having a threaded aperture for reception of said threaded stud, said first bracket means having another projecting leg, a threaded stud associated with said other projecting leg and complementary to said threaded aperture, second bracket means having at least one aperture threaded to be complementary to said studs, whereby said second bracket means may be secured releasably to either the tripod or said first bracket means, said second bracket means having a member axially reciprocable relatively thereto, third bracket means having a fitting secured to one end thereof, one end of said axially reciprocable member being formed to be complementary to said fitting, said fitting and member end having cooperating means whereby the latter may be secured to the former in a plurality of different positions, means for axially reciprocating said member, said fitting defining a socket adapted for the reception of said member end, and a removable pin member extending through said fitting and transversely of said fitting socket, said member end having a plurality of apertures extending transversely therethrough, said last mentioned apertures being angularly spaced, whereby said fitting and said member end may be secured releasably to each other in a plurality of different positions, said pin member and said last mentioned apertures constituting said cooperating means, said fitting laterally projecting from said third bracket means, and said last mentioned apertures being positioned substantially at right angles to each other.

11. A universal mounting device for a camera having a threaded mounting socket, the device comprising first bracket means having means for releasable attachment of said first bracket means to a fixed support, second bracket means having a member axially reciprocable relatively to said second bracket means, said first and second bracket means having complementary means for releasable securement to each other in a plurality of differently related positions, one of said complementary means comprising a threaded stud associated with said first bracket means, the other complementary means including an aperture threaded to be complementary to said stud and associated with said second bracket means, whereby said camera may be secured releasably to said first bracket means by said threaded mounting socket, and additional bracket means having a stud threaded to be complementary to said camera mounting socket, said additional bracket means having socket means, one end of said axially reciprocable member being formed to be complementary to said socket means, said member end of said socket means being releasably connectible in a plurality of differently related positions, whereby a camera secured to said additional bracket means may be positioned in a plurality of different attitudes.

12. A universal mounting device for a camera having a threaded mounting socket, the device comprising first bracket means having means for releasable attachment of said first bracket means to a fixed support, second bracket means having a member axially reciprocable relatively to said second bracket means, said first and second bracket means having complementary means for releasable securement to each other in a plurality of differently related positions, one of said complementary means comprising a threaded stud associated with said first bracket means, the other complementary means including an aperture threaded to be complementary to said stud and associated with said second bracket means, whereby said camera may be releasably secured to said first bracket means by said threaded mounting socket, and additional bracket means having a stud threaded to be complementary to said camera mounting socket, said additional bracket means having an open-ended tubular fitting defining socket means, one end of said axially reciprocable member being formed to be complementary to said socket means, said member end of said socket means being releasably connectible in a plurality of differently related positions, whereby a camera secured to said additional bracket means may be positioned in a plurality of different attitudes.

13. A universal mounting device for a camera having a threaded mounting socket, the device comprising first bracket means having means for releasable attachment of said first bracket means to a fixed support, second bracket means having a member axially reciprocable relatively to said second bracket means, said first and second bracket means having complementary means for releasable securement to each other in a plurality of differently related positions, one of said complementary means comprising a threaded stud associated with said first bracket means, the other complementary means including an aperture threaded to be complementary to said stud and associated with said second bracket means, whereby said camera may be secured releasably to said first bracket means by said threaded mounting socket, and additional bracket means having a stud threaded to be complementary to said camera mounting socket, said additional bracket means having an open-ended tubular fitting defining a bore extending therethrough, one wall of said fitting being apertured, said aperture and said bore being of substantially the same cross-sectional size and shape, one end of said axially reciprocable member being formed to be complementary to said cross-section, whereby said member end may be releasably connectible to said additional bracket means in a plurality of differently related positions so that a camera, secured to said additional bracket means, may be positioned in a plurality of different attitudes.

14. A universal mounting device for a camera having a threaded mounting socket, the device comprising first bracket means having means for releasable attachment of said first bracket means to a fixed support, second bracket means having a member axially reciprocable relatively to said second bracket means, said first and second bracket means having complementary means for releasable securement to each other in a plurality of differently related positions, one of said complementary means comprising a threaded stud associated with said first bracket means, the other complementary means including an aperture threaded to be complementary to said stud and associated with said second bracket means, whereby said camera may be secured releasably to said first bracket means by said threaded mounting socket, and additional bracket means having a stud threaded to be complementary to said camera mounting socket, said additional bracket means having socket means, one end of said axially reciprocable member being formed to be complementary to said socket means, said member end and said socket means being releasably connectible in a plurality of differently related positions, whereby a camera secured to said additional bracket means may be positioned in a plurality of different attitudes, the opposite end of said axially reciprocable member having a connector element pivotally secured thereto, said connector element having one end mounted for pivotal movement about an axis transversely of the longitudinal axis of said reciprocable member, the free end of said connector element being formed to be complementary to said socket means, whereby said additional bracket means may be secured to said member end or to said element end.

15. A universal mounting device for a camera having a threaded mounting socket, the device comprising first bracket means having means for releasable attachment of said first bracket means to a fixed support, second bracket means having a member axially reciprocable relatively to said second bracket means, said first and second bracket means having complementary means for releasable securement to each other in a plurality of differently related positions, one of said complementary means comprising a threaded stud associated with said first bracket means, the other complementary means including an aperture threaded to be complementary to said stud and associated with said second bracket means, whereby said camera may be secured releasably to said first bracket means by said threaded mounting socket, and additional bracket means having a stud threaded to be complementary to said camera mounting socket, said additional bracket means having an open-ended tubular fitting defining a bore extending therethrough, one wall of said fitting being apertured, said aperture and said bore being of substantially the same cross-sectional size and shape, one end of said axially reciprocable member being formed to be complementary to said cross-section, whereby said member end may be releasably connectible to said additional bracket means in a plurality of differently related positions so that a camera, secured to said additional bracket means, may be positioned in a plurality of different attitudes, the opposite end of said axially reciprocable member having a connector element pivotally secured thereto, said connector element having one end mounted for pivotal movement about an axis transversely of the longitudinal axis of said reciprocable member, the free end of said connector element being formed to be complementary to said cross-section, whereby said additional bracket means may be secured to said first end of said reciprocable member or to said connector element free end.

16. A universal mounting device adapted for mounting on a tripod having a threaded stud for cooperation with a threaded mounting socket of a camera, the device comprising first bracket means having provision for releasable attachment of said bracket means to a tripod or a fixed support, second bracket means comprising a casing and an axially reciprocable member, said casing having provision for releasable securement either to said camera mounting socket or to said first bracket means, third bracket means comprising an elongated member having a fitting secured to one end thereof, one end of said axially reciprocable member being complementary to said fitting, said fitting and said member end having cooperating means to secure said member end to said fitting in a plurality of different positions, and additional bracket means including a stud threaded to be complementary to said camera mounting socket, said additional bracket means comprising socket means, said member end and the other end of said elongated member being complementary to said socket means, whereby said additional bracket means may be secured releasably to said axially reciprocable member or to said elongated member.

17. A universal mounting device adapted for mounting on a tripod having a threaded stud for cooperation with a threaded mounting socket of a camera, the device comprising first bracket means having provision for releasable attachment of said bracket means to a tripod or a fixed support, second bracket means comprising a casing and an axially reciprocable member, said casing having provision for releasable securement either to said camera mounting socket or to said first bracket means, third bracket means comprising an elongated member having a fitting secured to one end thereof, one end of said axially reciprocable member being complementary to said fitting, said fitting and said member end having cooperating means to secure said member end to said fitting in a plurality of different positions, and additional bracket means including a stud threaded to be complementary to said camera mounting socket, said additional bracket means comprising socket means, said member end and the other end of said elongated member being complementary to said socket means, whereby said additional bracket means may be secured releasably to said axially reciprocable member or to said elongated member, the opposite end of said axially reciprocable member having a connector element pivotally secured thereto, said connector element having one end mounted for pivotal movement about an axis transversely of the longitudinal axis of said reciprocable member, the free end of said connector element being formed complementary to said socket means, whereby said additional bracket means may be secured to said connector element.

18. A universal mounting device adapted for mounting on a tripod having a threaded stud for cooperation with a threaded mounting socket of a camera, the device comprising first bracket means having provision for releasable attachment of said bracket means to a tripod or a fixed support, second bracket means comprising a casing and an axially reciprocable member, said casing having provision for releasable securement either to said camera mounting socket or to said first bracket means, third bracket means comprising an elongated member having a fitting secured to one end thereof, one end of said axially reciprocable member being complementary to said fitting, said fitting and said member end having cooperating means to secure said member end to said fitting in a plurality of different positions, and additional bracket means including a stud threaded to be complementary to said camera mounting socket, said additional bracket means comprising socket means, said member end and the other end of said elongated member being complementary to said socket means, whereby said additional bracket means may be secured releasably to said axially reciprocable member or to said elongated member, said first bracket means comprising a pair of complementary angle members pivotally connected to each other, whereby said angle members are adjustable angularly relatively to each other, one of said angle members having a projecting leg, said leg having an aperture threaded to be complementary to the tripod threaded stud for mounting on said tripod, and the other angle member comprising a projecting leg having a stud associated therewith, the latter stud being threaded to be complementary to said camera mounting socket.

19. A universal mounting device adapted for mounting on a tripod having a threaded stud for cooperation with a threaded mounting socket of a camera, the device comprising first bracket means having provision for releasable attachment of said bracket means to a tripod or a fixed support, second bracket means comprising a casing and an axially reciprocable member, said casing having provision for releasable securement either to said camera mounting socket or to said first bracket means, third bracket means comprising an elongated member having a fitting secured to one end thereof, one end of said axially reciprocable member being complementary to said fitting, said fitting and said member end having cooperating means to secure said member end to said fitting in a plurality of different positions, and additional bracket means including a stud threaded to be complementary to said camera mounting socket, said additional bracket means comprising an open-ended tubular fitting defining a bore extending therethrough, one wall of said fitting being apertured, the latter aperture and said bore being of substantially the same cross-sectional size and shape, and defining socket means, said member end and the other end of said elongated member being complementary to said socket means, whereby said one end of said reciprocable member and the opposite end of said elongated member may be releasably connectible to said additional bracket means in a plurality of differently related positions.

References Cited in the file of this patent
UNITED STATES PATENTS

| | | |
|---|---|---|
| 2,614,471 | Markowitz | Oct. 21, 1952 |
| 2,666,610 | Nerman | Jan. 19, 1954 |